Feb. 24, 1970     J. D. SMITH     3,496,896
HIGH STRENGTH RECEPTACLE

Filed Sept. 13, 1967     3 Sheets-Sheet 1

INVENTOR.
JAMES D. SMITH
By
Frederick C. Weidner Jr.
Attorney

INVENTOR.
JAMES D. SMITH

INVENTOR.
JAMES D. SMITH

United States Patent Office 3,496,896
Patented Feb. 24, 1970

3,496,896
HIGH STRENGTH RECEPTACLE
James D. Smith, Lower Burrell, Pa., assignor to Aluminum Company of America, Pittsburgh, Pa., a corporation of Pennsylvania
Filed Sept. 13, 1967, Ser. No. 667,512
Int. Cl. B21d 22/24, 51/12
U.S. Cl. 113—120                                                    4 Claims

ABSTRACT OF THE DISCLOSURE

A metal foil receptacle such as a pie pan having high strength imparted to it and the method of making such a pan by drawing a sheet of metal foil to form the pan with corrugations in the side wall, forming a circumferential downwardly concave rim flange, and curling the outer edge of said flange to form a bead.

BACKGROUND OF THE INVENTION

It is well known that pies and the like are normally merchandised in metallic foil pie pans so that the ultimate consumer can subsequently bake or heat the pie directly in its pan. Heretofore, in order to make such foil pans of sufficient strength, it has been necessary to use a relatively thick metallic foil. The thicker foil, however, is more expensive.

Manufacturers of metal foil pans such as pie pans have been striving to strengthen the pie pan by changing its structural configuration so that a thinner gage of metallic foil can be utilized while still providing the desired strength for the pie pan.

Moreover, when pie pans are utilized in connection with conventional pie filling machines, the pans are suspended on their rim flanges between two spaced parallel bars or rods after they have been filled and are in the process of being removed from the filling machine. It is, therefore, important that in this position the pans be strong so that they do not fold or collapse and fall between the spaced bars.

While structural configurations can be changed to increase the strength of the pans, the final structure must also be such that the pans will nest one within the other with the beads engaging each other in what is referred to as bead-to-bead stacking. This arrangement affords efficient stacking of multiple pans and makes dispensing the individual pans from a stack by automatic pan feeding equipment trouble free, fast and efficient.

SUMMARY OF THE INVENTION

This invention relates to a foil pan, such as a foil pie pan, having a bottom transverse wall and an upwardly and outwardly slanting side wall interconnected to the bottom transverse wall, and having an outwardly directed substantially horizontal peripheral rim flange terminating at its outer edge in an annular reinforcing bead. In making a pan of this type, a blank is normally cut from a sheet of metal foil such as aluminum foil. The blank is then drawn into a pan shape by means of a punch and die. During forming of a metal foil blank into a pan, wrinkles or corrugations are formed in the side wall of the pan due to the foil being crowded in the outer peripheral area. The fact that wrinkling occurs in the side wall during the drawing or stamping operation is well known. Heretofore, when the forming dies were fully closed the wrinkles were reformed by pressing which caused them to break up into striations which were small in width, height and length and very irregular in shape.

I have found that by permitting corrugations to form in the side wall of the pan with very little restriction and not reforming these corrugations even when the forming dies are fully closed that the corrugations have substantially uniformly disposed curved ridges and grooves projecting inwardly and outwardly of the side wall plane and they extend uninterrupted substantially the height of the side wall. By forming corrugations of this type in the side wall considerable strength is added to the foil pan. I have also found that when the corrugations formed in the side wall of the pan are formed of nearly maximum height but not interfering with bead-to-bead stacking of a plurality of such pans that maximum pan strength is achieved. The manner in which these foil pans are formed to provide these desirable corrugations will be described hereinbelow.

Another structural feature of this invention that contributes to the high strength of the foil pan is that of curving the outwardly extending rim flange so that it is slightly concave downwardly throughout the width of the flange. The center of the bead at the outer terminal edge of the peripheral flange should be located no higher than the junction of the side wall and the peripheral flange. The amount of curvature or concavity of the rim flange may vary somewhat depending upon the width of the rim flange of the particular pan. The radius of curvature should, however, always be greater than the width of the flange and for best results it should be from 2 to 6 times that of the flange width. The curvature of the rim flange can be accomplished by providing the desired radius on that portion of the die which forms the rim flange, as will be more fully described hereinafter.

DESCRIPTION OF THE PREFERRED EMBODIMENT

Figure 1:
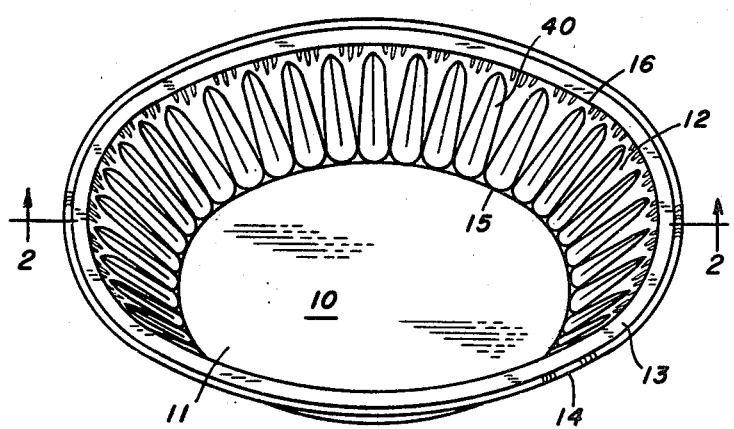
FIG. 1 is a top perspective view illustrating the improved pan of this invention.
Figure 2:
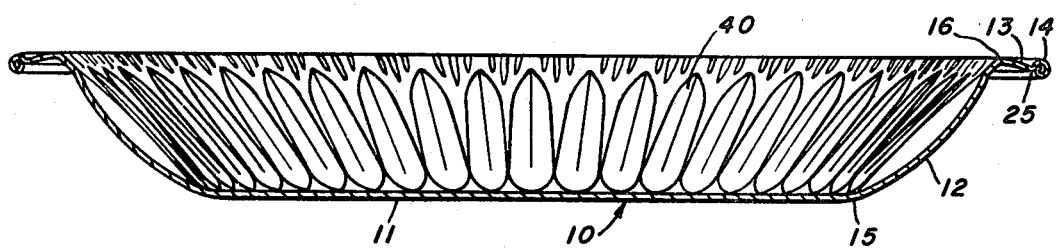
FIG. 2 is a cross-sectional view taken on line 2—2 of FIG. 1.

The improved foil pan of this invention is generally indicated by the reference numeral 10 in FIGS. 1–6 and comprises a substantially flat transverse bottom wall 11 integrally interconnected at the junction area 15 to an upwardly and outwardly slanting side wall 12 having an outwardly directed peripheral rim flange 13 interconnected at the junction 16 with the top edge of the side wall 12, the peripheral flange having its outer edge terminating in an annular reinforcing curled bead 14.

In FIGS. 1-6, the structural features of this invention that combine to impart considerable strength to the pan are specifically shown. The side wall 12 of the pan 10 has corrugations 40 formed therein. Corrugations in the side wall of such pans occur when the sheet metal foil is drawn into a pan shape having less diameter than the original sheet. These corrugations have ridges and grooves projecting inwardly and outwardly of the side wall center plane, designated C in FIG. 3. In the conventional drawing die arrangement for making metal foil pans, there is a cooperating punch and die set that draw or stamp the foil blank into the desired pan shape. The punch and die used heretofore had mating surfaces so that corrugations of the metal foil in the side wall of the side wall 12 when the pan was being drawn were restricted by the closing punch and die which squeezed the relatively large ridges and grooves into smaller ridges and grooves thereby producing striations. The ridges and grooves of the striations caused by the squeezing action of the closing punch and die are not nearly as uniform in shape nor as large as those formed without any or very little squeezing. I have found that if the ridges and grooves of the corrugations formed in the side wall of the receptacle are of nearly maximum height in departure from the center plane, designated C in FIG. 3, of the side wall 12 but not interfering with bead-to-bead stacking of a plurality of such pans that the corrugations are more uniform in size and shape throughout their extent and contribute more to the strength of the pan than the striations mentioned above heretofore caused by the closed punch and die.

I achieve this desired corrugation formation in the side wall of the pan by the punch and die arrangement shown in FIGS. 3-6. The particular female die 17 shown in FIGS. 3-6 is provided with a bottom forming surface 18 for shaping the bottom transverse wall 11 of the pan 10 when a particular bottom embossed design is desired. If a flat bottom wall is desired the die 17 may simply have a cavity area instead of a forming surface which is well known as a conventional practice. The side wall forming portion of the die 17 is provided with a relief or cavity area 19. The cooperating punch 20 is provided with a bottom surface 21 that cooperates with the die 17 to form bottom wall 11 of the pan 10. The pan side wall forming portion of the punch 20 is also provided with a relief or cavity area 22. When the punch 20 and die 17 are closing to form the pan 10, the metal foil forming the side wall of the pan is stretched between the circumferential radius 70 of the punch 20 and the circumferential radius 71 of the die 17. During this operation the metal foil forming the side wall of the pan wrinkles to form corrugations. By providing the relief cavities 22 and 19 in the punch and die, respectively, the corrugations caused by the wrinkling are formed and when the dies are closed these corrugations are not reformed to any great extent by squeezing them as was the practice heretofore. The relief cavities 22 and 19 may be adjusted for any given pan configuration so that the ridges and grooves of the corrugations produced are nearly maximum height in departure from the center plane of the side wall 12 as possible without interfering with bead-to-bead stacking of the finished pans. When the ridges and grooves of the corrugations in the side wall of any given pan are too high they prevent bead-to-bead stacking.

Another structural feature of this invention that adds strength to the foil pan is the downwardly concave curved shape of the rim flange 13. The curve of the rim flange 13 extends from the junction 16 of the side wall 12 and the rim flange 13 to the annular bead 14 disposed at the outer edge of the rim flange 13. For maximum pan strength the center of the bead 14 should be located no higher than the junction 16 of the side wall 12 and the rim flange 13. Although the amount of curvature of the rim flange may vary, I have found that the radius of curvature, designated R in FIG. 3, should be greater than the flange width and a ratio of from 2 to 6 times that of the flange width gives good results. The center point, designated P in FIG. 3, about which the radius of curvature is generated is preferably located on or in close proximity to a line vertically depending from the junction 16 between the side wall 12 and the flange 13 so that the flange is inclined in a downward direction as best seen in FIGURES 2 and 4 to 6. This downwardly concave curve in the rim flange is accomplished as shown in FIGS. 3-6 by the cooperation of the rim flange forming surface 24 of the die 17 and the forming surface 41 of a clamping die 23.

Figure 3:
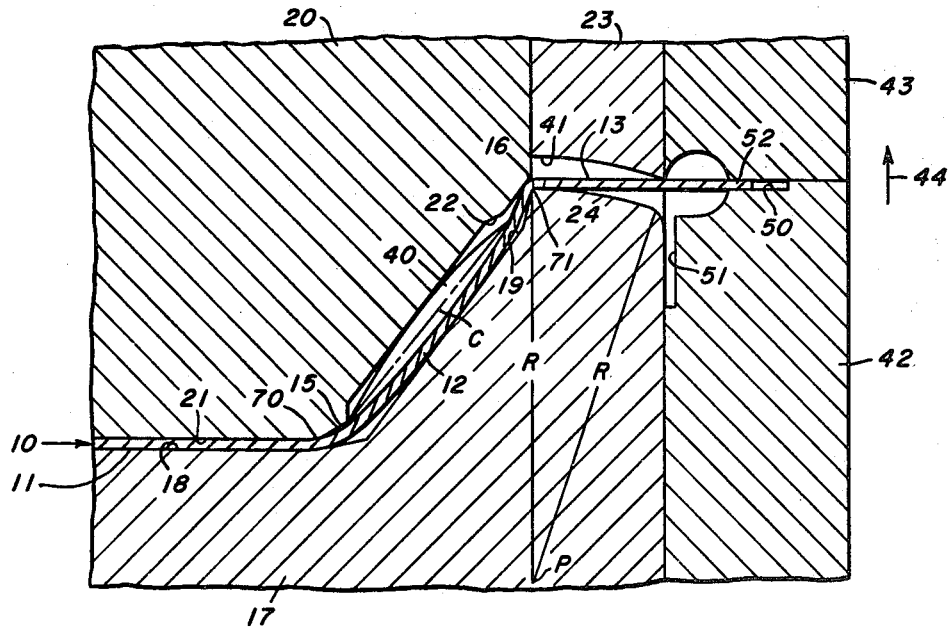
FIG. 3 is a schematic fragmentary, enlarged cross-sectional view of the pan illustrated in FIG. 2 being formed and also illustrating the dies used in forming the pan.
Figure 4:
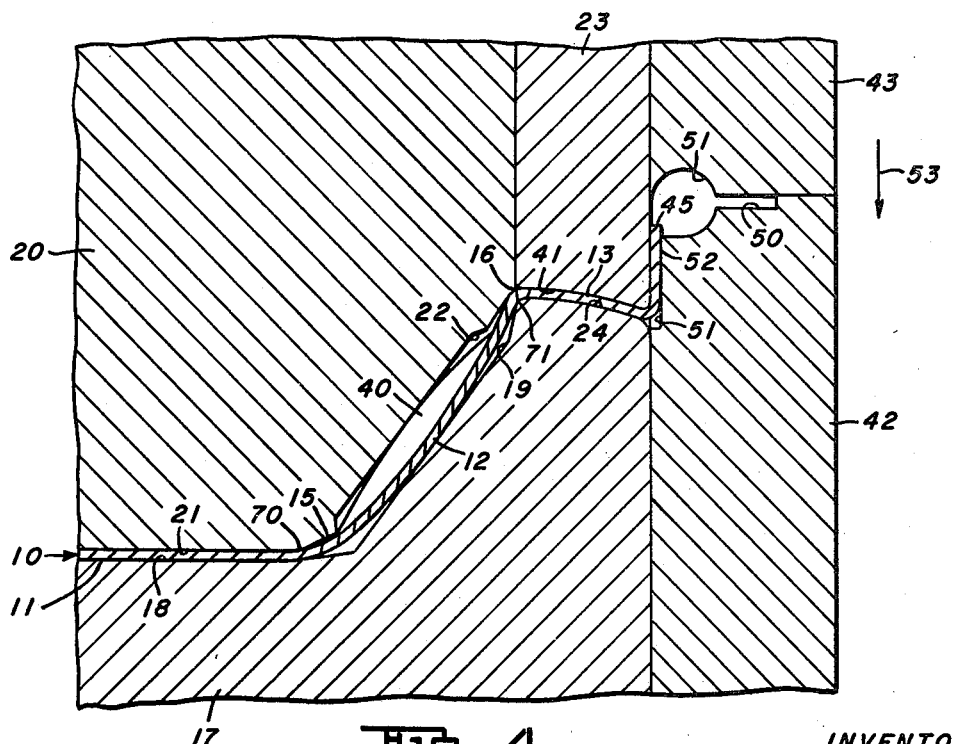
FIG. 4 is similar to FIG. 3 but showing the rim flange being formed.
Figure 5:
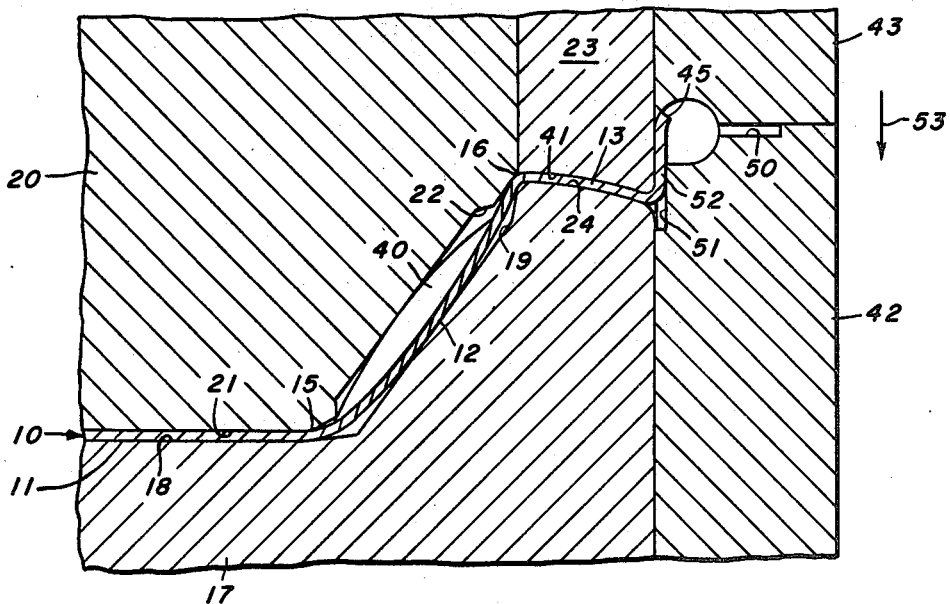
FIG. 5 is similar to FIG. 4 but showing the start of the bead curling operation.
Figure 6:
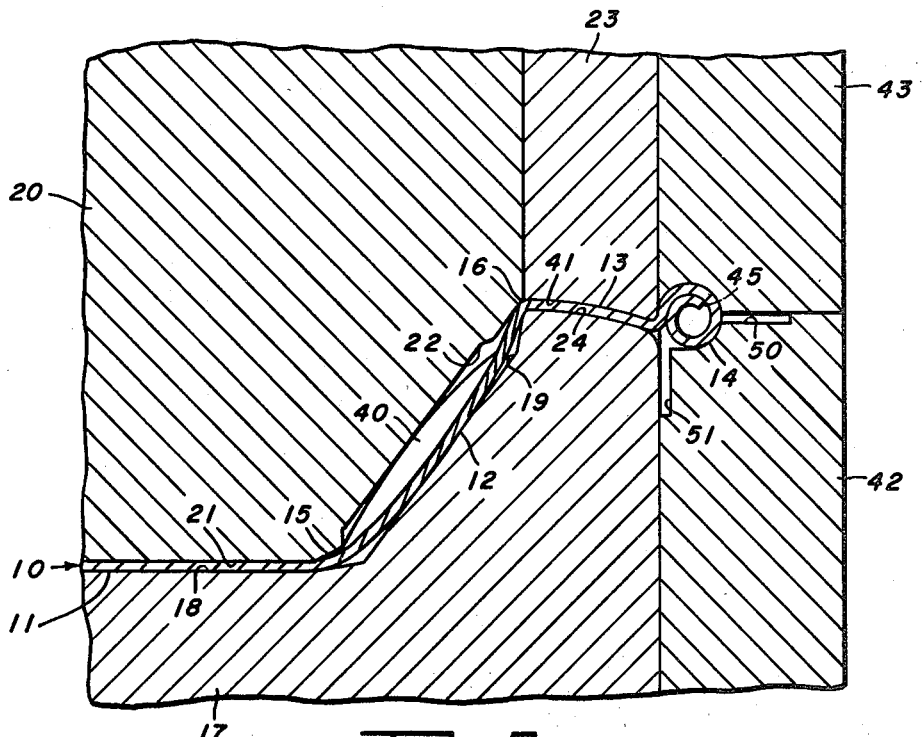
FIG. 6 is similar to FIG. 5 with the final bead curling operation complete.

When the bottom transverse wall 11, side wall 12 and rim flange 13 are formed by closing die 17, punch 20 and clamping die 23 the free terminal end 52 of the metal foil blank lies between curling dies 42 and 43 and in a horizontal recess 50 in the curling die 42. The curling dies 42 and 43 as shown in FIG. 3 are moved in the direction indicated by arrow 44 relative to the die 17 and clamping die 23 to wipe the free terminal end 52 thereby removing it from horizontal recess 50 and positioning it adjacent clamping die 23 in the vertical recess 51 in curling die 42 as shown in FIG. 4. The bead curling or forming dies 42 and 43 are then moved in the direction indicated by the arrow 53 in FIGS. 4 and 5 so that the bead forming die 43 comes into contact with the edge 45 of the free terminal end 52 of the metal foil and begins the curling operation as shown in FIG. 5. The bead curling dies 42 and 43 continue moving in the same direction indicated by the arrow 53 to carry the bead forming dies 42 and 43 far enough to complete the curling operation as shown in FIG. 6.

The pans 10 of this invention not only exhibit high strength but they nest one within the other with the beads 14 thereof engaging the beads 14 of adjacent stacked pans. By this structure a stack of pans may be transported and stored with maximum economy and can be utilized in conventional pie making machinery because they readily separate from each other and no time is lost due to shut down to denest the stacked pans.

TESTS

Foil pans of this invention such as pie pans are normally suspended by the peripheral rim flange thereof when employed in conjunction with conventional pie filling machinery and the like. The standard strength test for pans recognized by the Aluminum Foil Container Manufacturers Association is one where the foil pan is placed between two parallel spaced rods and supported thereon only by the rim flange. Lead shot or the like is poured into the pan until the strength of the receptacle is overcome and it folds and falls through the parallel bars. The more shot the receptacle can hold before folding and falling between the bars the stronger the receptacle. That test procedure was used in all of the experiments set forth herein and the test apparatus employed was purchased from the Aluminum Foil Container Manufacturers Association.

The strength of a foil pan made in accordance with this invention was compared with the strength of a prior art pan. The prior art pan had a bottom wall, an outwardly slanting side wall integrally interconnected to the bottom wall, and an outwardly directed substantially horizontal peripheral flange terminating at its outer edge in an annular reinforcing bead.

In the tests conducted the alloy designations are those established by the Aluminum Association for wrought aluminum alloys. The aluminum foil for all pans was in the extra hard temper, designated H19 in the Aluminum Association (U.S.) Standards for Aluminum Mill Products 1963.

One group of tests comparatively evaluated the strength of the prior art pan against a pan made in accordance with this invention with the diameter, foil gage, alloy and temper identical. The results of this group of comparative tests are summarized in Table 1 below.

TABLE 1

| Test No. | Pan overall diameter, inches | Flange width, inches | Radius of flange curvature of invention pan, inches | Aluminum foil gage in inches | Aluminum alloy and temper | Prior art pan weight added in lbs. | Invention pan weight added in lbs. | Percent increase in strength |
|---|---|---|---|---|---|---|---|---|
| 1 | 8 | .384 | 1 | .0030 | 3003, H19 | 1.8 | 2.7 | 66 |
| 2 | 8 | .384 | 1 | .0034 | 5052, H19 | 2.1 | 3.5 | 60 |
| 3 | 8 | .562 | 2 | .0031 | 3003, H19 | 3.7 | 4.9 | 75 |
| 4 | 9 | .389 | 2 | .0042 | 3003, H19 | 2.1 | 3.5 | 60 |
| 5 | 9 | .389 | 2 | .0034 | 5052, H19 | 1.3 | 3.1 | 42 |

Another group of tests consisted of comparing prior art pans made of varying aluminum foil gage thicknesses against pans made in accordance with this invention but with the aluminum foil being thinner in gage. The pans compared were of the same alloy and temper. The results of these tests are shown in Table 2 below.

TABLE 2

| Test No. | Pan overall diameter, inches | Flange width, inches | Radius of flange curvature of invention pan, inches | Aluminum alloy and temper | Prior art pan aluminum foil gage, inches | Prior art pan weight added in lbs. | Invention pan aluminum foil gage, inches | Invention pan weight added in lbs. |
|---|---|---|---|---|---|---|---|---|
| 1 | 8 | .384 | 1 | 3003, H19 | .0032 | 2.2 | .0031 | 2.7 |
| 2 | 8 | .562 | 2 | 3003, H19 | .0031 | 3.7 | .0030 | 4.6 |
| 3 | 9 | .389 | 2 | 1100, H19 | .0037 | 1.6 | .0032 | 2.0 |
| 4 | 9 | .389 | 2 | 3003, H19 | .0035 | 1.6 | .0034 | 2.3 |
| 5 | 9 | .389 | 2 | 5050, H19 | .0040 | 1.8 | .0036 | 3.1 |

It can readily be seen from Table 1 that pans of the same size made from the same aluminum alloy, gage and temper are substantially stronger when they are made in accordance with this invention as compared to the prior art pan. It can also be seen from Table 2 that pans made in accordance with this invention could hold a substantial amount of increased weight over the prior art pans even though the foil gage thickness was less.

While various features of this invention are described and illustrated as being particularly adaptable for providing a pie pan and the like, it is to be understood that that various features of this invention can be utilized singly or in any combination thereof to provide other pans as desired.

This invention is not to be limited to only the embodiments illustrated in the drawings, but the drawings are merely utilized to illustrate one of the wide variety of uses of this invention.

What is claimed is:
1. The method of making a metal foil pan having a bottom transverse wall and a side wall interconnected with and extending upwardly and outwardly from said bottom wall, the free end of said side wall having a peripheral flange terminating in a bead, the steps comprising:
   drawing a sheet of metal foil between a punch and a die to form a bottom wall and side wall of a pan while providing relief cavities in both the punch and die to allow the formation of corrugations with substantially uniformly disposed curved ridges and grooves projecting inwardly and outwardly of the side wall center plane, the relief cavities providing substantially no reforming of the corrugations when the punch and die are fully closed,
   forming a downwardly inclined concave peripheral flange extending outwardly of said side wall, and
   curling the outer edge of said peripheral flange to form a bead.
2. The method according to claim 1 wherein the peripheral flange is formed to a concavity having a radius of from 2 to 6 times that of the flange width.
3. The method of making an aluminum foil pan having a bottom transverse wall and side wall interconnected with and extending upwardly and outwardly from said bottom wall, the free end of said side wall having a peripheral flange terminating in a bead, the steps comprising:
   drawing a sheet of aluminum foil between a punch and a die to form a bottom wall and side wall of a pan while providing relief cavities in both the punch and die to allow the formation of corrugations with substantially uniformly disposed curved ridges and grooves projecting inwardly and outwardly of the side wall center plane, the relief cavities providing substantially no reforming of the corrugations when the punch and die are fully closed,
   forming a downwardly inclined concave peripheral flange extending outwardly of said side wall wherein the peripheral flange is formed into a concavity having a radius of from 2 to 6 times that of the flange width, and
   curling the outer edge of the peripheral flange to form a peripheral bead.
4. The method according to claim 3 wherein the corrugations formed in the side wall of the pan are formed of nearly maximum height not interfering with bead-to-bead stacking of a plurality of pans so formed.

References Cited

UNITED STATES PATENTS 2,899,922 8/1959 Wheeler.
3,099,377 7/1963 Metzler _____ 220—74
3,229,886 1/1966 Grocel _____ 220—72

RICHARD J. HERBST, Primary Examiner

U.S. Cl. X.R.
72—348